United States Patent

Ninomiya et al.

Patent Number: 5,512,075
Date of Patent: Apr. 30, 1996

[54] FOLDED FILTER ELEMENT FOR FILTERING FLUID

[75] Inventors: Hitoshi Ninomiya, Kariya; Kenichi Katoh; Toshiaki Fukuta, both of Nagoya, all of Japan

[73] Assignee: Nippondenso Co., Ltd., Kariya, Japan

[21] Appl. No.: 222,818

[22] Filed: Apr. 5, 1994

[30] Foreign Application Priority Data

| Apr. 5, 1993 | [JP] | Japan | 5-078002 |
| Mar. 8, 1994 | [JP] | Japan | 6-036798 |

[51] Int. Cl.$^6$ ................................................. B01D 46/52
[52] U.S. Cl. ................................. 55/497; 55/511; 55/521; 55/524
[58] Field of Search ................. 55/521, 524, 527, 55/528, 511, 497

[56] References Cited

U.S. PATENT DOCUMENTS

| 2,022,740 | 12/1935 | Rowell | 55/521 |
| 3,022,861 | 2/1962 | Harms | 55/521 |
| 3,410,062 | 11/1968 | Hart | 55/521 |
| 3,513,643 | 5/1970 | Tarala | 55/524 |
| 3,870,495 | 3/1975 | Dixson et al. | 55/524 |
| 3,961,924 | 6/1976 | Alskog | 55/521 |
| 4,181,513 | 1/1980 | Fukuda et al. | 55/524 |
| 4,452,619 | 6/1984 | Wright et al. | 55/521 |
| 4,504,290 | 3/1985 | Pontius | 55/524 |
| 4,510,193 | 4/1985 | Blucher et al. | 55/524 |
| 4,655,921 | 4/1987 | Fujimoto | 55/521 |
| 4,738,778 | 4/1988 | Taki et al. | 55/521 |
| 5,128,039 | 7/1992 | Gabrielson | 55/521 |
| 5,256,103 | 10/1993 | Abthoff et al. | 55/524 |
| 5,320,657 | 6/1994 | Adams | 55/521 |

FOREIGN PATENT DOCUMENTS 1-65628  4/1989  Japan.

*Primary Examiner*—Jay H. Woo
*Assistant Examiner*—Duane S. Smith
*Attorney, Agent, or Firm*—Cushman, Darby & Cushman

[57] ABSTRACT

A deodorizing air filter is capable of improving the strength and deodorizing ability while suppressing an increase of ventilation resistance and pressure loss. A filter body has a series of filter pieces which are formed into a zigzagged shape by folding along multiple folds of parallel lines of the filter element. The filter body is made of the deodorizing section and the filtering section formed alternatively, the filtering section of the air serves as a filter and deodorizer for the air, and the deodorizing section serves as a deodorizer for the air. As the deodorizing section does not serve as a filter, it is not necessary to make the pitch of each piece of the filtering section smaller. As a result, it is possible to suppress the increase of ventilation resistance and pressure loss.

15 Claims, 4 Drawing Sheets

FOLDED FILTER ELEMENT FOR FILTERING FLUID

BACKGROUND OF THE INVENTION

1. Field of the Invention

The present invention relates to a filter formed by folding a filter element into zigzagged, corrugated or pleated configurations, and is preferably applied to an air filter having a deodorant function.

2. Description of the Related Art

Conventionally, an air filter for filtering and deodorizing air for an air conditioner has been known, in which a filtering body is made from an air filtering sheet containing deodorant as an air filter element and formed into a zigzagged shape by folding the air filtering sheet along multiple parallel, straight folds (hereinafter referred to as the deodorant air filter).

Accordingly, such a filter body has a shape made up of a series of filter pieces sectionally formed between a pair of adjacent folds in the filter sheet, and a pitch between each of folds, i.e., a length of each piece of the filter sheet, is equally formed.

However, in the above-mentioned conventional deodorant filter, since the shape of the filter body is primarily defined by dimensions in the directions of face and thickness, there has been no way to improve the filter's deodorizing ability other than to increase the number of filter pieces forming the filter body by reducing the pitch between each of the folds.

On the other hand, although ventilation resistance and pressure loss are improved to some extent by reducing the pitch between each of the folds, in case the pitch is beyond the optimal pitch, a clearance between two adjacent pieces becomes too narrow, as a result, the ventilation resistance and pressure loss increase.

Consequently, the conventional filter body has a problem that ventilation resistance and pressure loss increase as the number of pieces of sheet forming the filter body increase by reducing the pitch between the folds in order to improve deodorizing ability.

Instead of increasing the number of filter pieces forming the filter body by reducing the pitch between the folds, it is also possible to improve deodorizing ability by increasing the thickness of the filter sheet, that is, by increasing the amount of deodorant to be adhered. However, such a thick sheet makes ventilation resistance and pressure loss increase and also makes the process of folding the sheet difficult.

Furthermore, an equally-pitched conventional filter has a problem that, when it is installed to cover a wide area in a plane form, it deforms, thereby giving way to air flow (the fluid to be filtered) due to a low bending strength in a direction of the sheet's thickness. Particularly, there has been a problem that air flow quantity may be reduced for filtering ability may be deteriorated when the filter deflects towards the downstream direction, the top portion of the folded filter element deforms into a meandering shape, or pieces of the filter element stick together closely. Such a problem is likely to occur when ventilation resistance increases due to the clogging of a filter element which has been used for a long period of time, or under environments of high temperature and high humidity. Particularly, since a filter for purifying air mounted on an inlet port of an air conditioner for vehicles is used under automotive conditions providing a high temperature environment and a high humidity environment, it is likely that the adhesive strength of hot melt type adhesive used for bonding the filter is deteriorated due to the high temperature, or the rigidity of filter element made of paper is deteriorated due to high humidity and rain water penetration. For these reasons, improvement of the filter has been greatly needed.

SUMMARY OF THE INVENTION

In view of the above-mentioned problems in the conventional filter, it is a purpose of the present invention to improve the strength of a filter to be formed by a folding filter element.

It is another purpose of the present invention to provide a deodorant filter which is capable of improving its deodorizing ability while suppressing an increase in ventilation resistance and pressure loss.

According to first aspect of the present invention, a filter has a filter element for filtering fluid formed into a wave shape by folding with an equal pitch and disposed in a substantially perpendicular direction to the fluid flow direction, and the filter element is provided with a small pitch portion having a smaller pitch than the equal pitch, where the small pitch portion is partially formed between the equal pitches.

According to second aspect of the present invention, a filter element has tow leaning filter pieces which form a V-shape to make a predetermined angle to the fluid flow direction, and two parallel filter pieces extending from a vertex to an opening end of the V-shape in parallel with the fluid flow.

According to third aspect of the present invention, a filter element has a plurality of leaning filter pieces which make a predetermined angle to the fluid flow direction and a parallel filter piece extending substantially in the fluid flow direction, where one end of the parallel filter piece is connected to the leaning filter piece and the other end is connected to another parallel filter piece is connected to the leaning filter piece and the other end is connected to another parallel filter piece.

It is preferable that a pair of adjacent filter pieces for the small pitch portion are bonded together by an adhesive layer.

Also, it is preferable that a pair of adjacent filter pieces of the small pitch portion extend substantially in parallel with the fluid flow.

According to the present invention, since the pitch of the filter is partially made smaller, namely, the length between the filter pieces become smaller in the small pitch portion, the strength of the filter against bending forces is improved. Further, it is also possible to avoid an increase in ventilation resistance.

Moreover, the adjacent filter pieces of the small pitch portion bonded to each other further improves the strength of a filter.

Furthermore, the adjacent filter pieces of the small pitch section bonded to each other by the adhesive layer also increases the strength of the filter.

Since the adjacent filter pieces for the smaller pitch portion are substantially parallel to the fluid flow direction, it is possible to avoid an increase in ventilation resistance and to improve the bending strength of the filter in the fluid flow direction.

DETAILED DESCRIPTION OF THE PREFERRED EMBODIMENTS

A first embodiment of the deodorizing air filter according to the present invention is explained below with respect to FIGS. 1–3.

Figure 1:
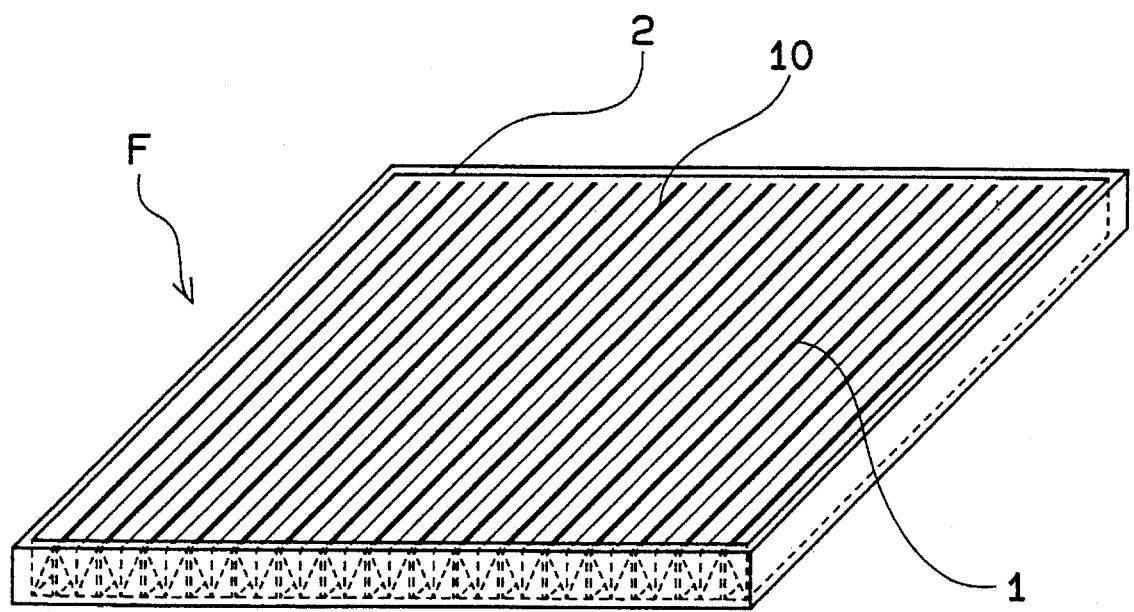
FIG. 1 is a perspective view showing an embodiment of a deodorizing air filter of the present invention.
Figure 3:
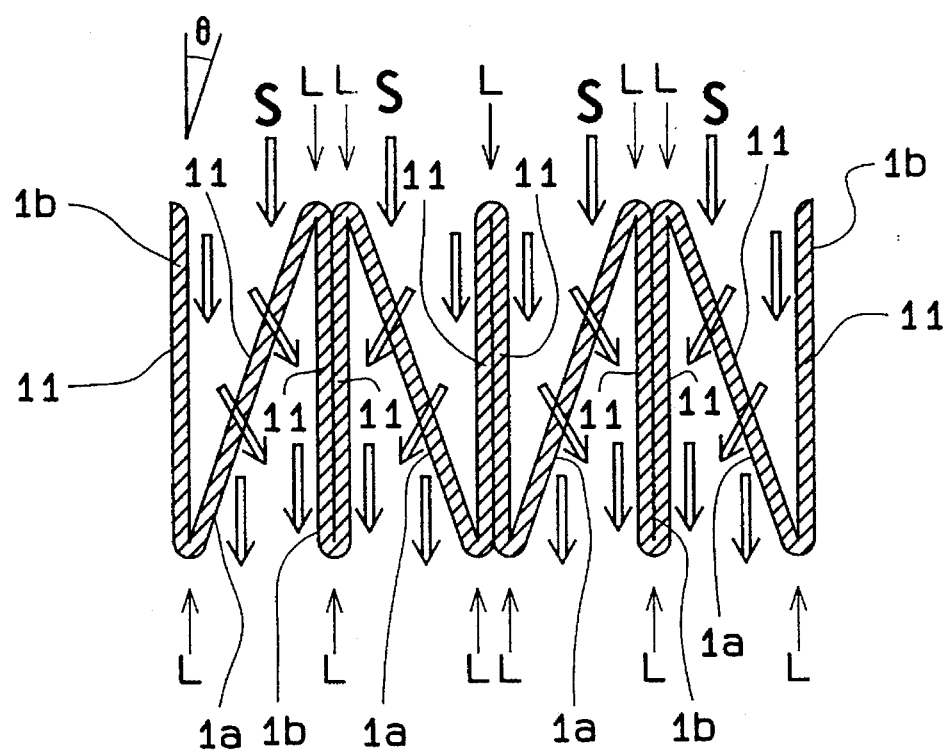
FIG. 3 is a partially sectional view of the filter body of the deodorizing air filter shown in FIG. 1.

FIG. 1 shows a perspective view of the deodorizing air filter F, and FIG. 3 shows the partially sectional view thereof.

The deodorizing air filter F comprises a filter body 1 formed into a plane shape by folding an air filtering sheet 10 into a zigzagged shape and a frame 2 in a square shape for holding four perimeter sides of the filter body 1, with the lengths of, for example, 20 cm, width of 20 cm and thickness of 2 cm. The sheet 10 is made from, for example, nonwoven fabric, about 0.4 mm in thickness, made of rayon and activated carbon, on which a deodorant (a chemical for chemical absorption in this embodiment, not shown) is directly adhered. The sheet may be also made, for example, by mixing the deodorant made of odor absorbent and odor decomposing catalyzer thereto when woven or nonwoven fabric is manufactured or by putting a sheet containing deodorant and a dust prevention filtering sheet together.

As shown in FIG. 3, the filter body 1 is formed into a zigzagged shape by folding filter sheet 10 along folds L which are parallel to each other, therefore, it has a shape made up of continuous sheet pieces 11 sectionally formed between adjacent folds L in sheet 10.

The important point in this embodiment is that filter body 1 comprises filtering section 1a which has an air filtering function and deodorizing section 1b which has conversely no air filtering function.

The filtering section 1a is made up of one sheet piece 11 which has the same shape and arrangement as the sheet piece for the conventional filter body, and is disposed to lean into a main air flow direction S at a predetermined angle 0 in an air conditioner. On the other hand, a deodorizing section 1b is formed by putting two adjacent pieces of sheet 11 together and extends in the main flow direction S. It is also possible to construct the filtering section 1a and the deodorizing section 1b with still more sheet pieces 11.

Figure 2:
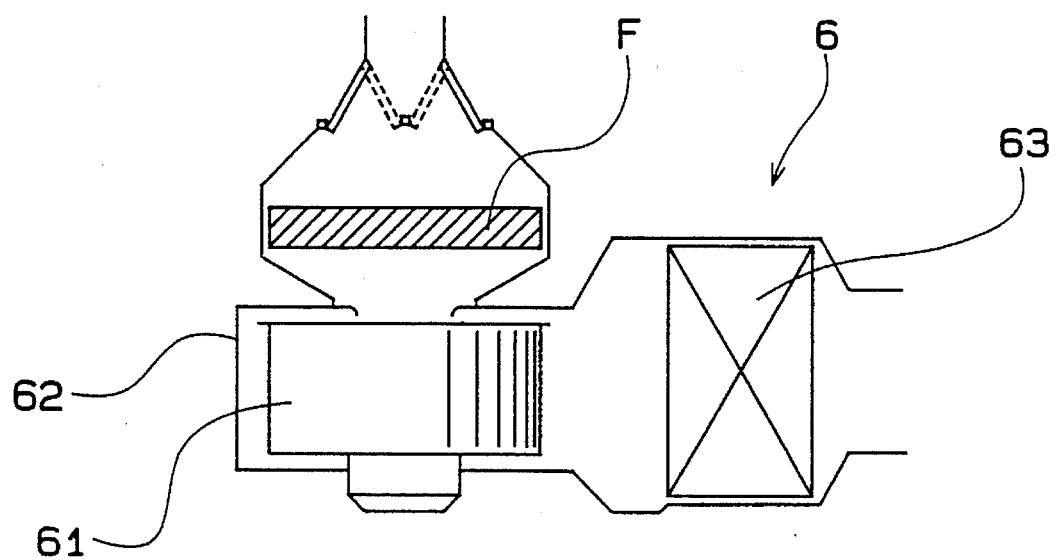
FIG. 2 is a schematic sectional view showing the deodorizing air filter in shown FIG. 1 installed on an air conditioner for automobiles.

The deodorizing air filter F is installed in air conditioner 6 for a vehicle as shown in FIG. 2. Air introduced by blower 61 into the system through an internal/external air switching damper 62 has dust and odor removed therefrom by the deodorizing air filter F, is led to a heater (not shown) through an evaporator 63, and is discharged as temperature controlled air. The damper for mixing non-temperature controlled air with temperature controlled air in a desirable ratio is not shown in this embodiment. Furthermore, the deodorizing air filter F may be disposed between the evaporator 63 and the blower 61, instead of being disposed in front of blower 62.

As shown in FIGS. 2 and 3, the air flow introduced by blower 61 passes in the air flow direction S at a right angle to the facing direction of the deodorizing air filter F, is generally bent to perpendicular direction to the leaning direction of the filtering section 1a proximate thereto, and passes through the filtering section 1a.

Figure 4:
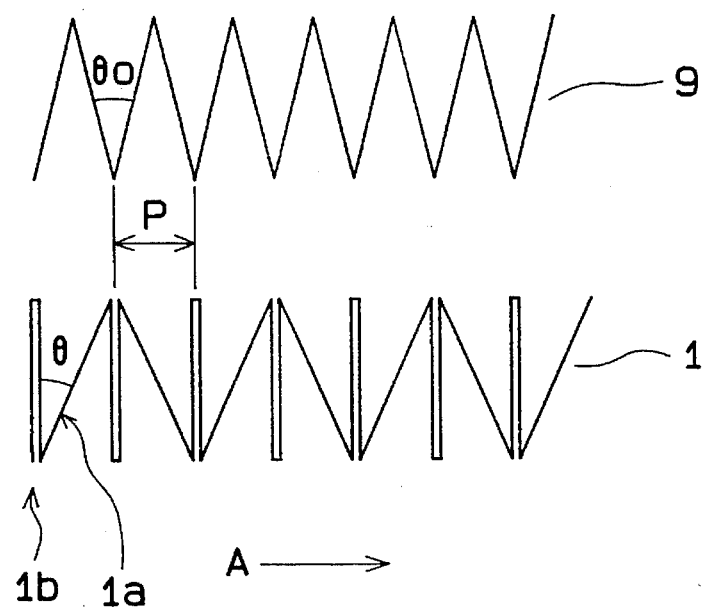
FIG. 4 is a contraposition view for comparison of deodorizing air filter of the present invention with the conventional type.

FIG. 4 shows contraposition and comparison of the shape of the filter body 1 in this embodiment and the conventional filter body 9 in the direction A at a right angle to the main flow direction S and the fold L respectively. The pitches P of filter bodies 1 and 9 in the direction A are equal to one another.

In this case, since an opening angle 0 of the filter body 1 is approximately equal to an opening angle $0_o$ of the filter body 9, their ventilation resistance and pressure loss are regarded as almost equal.

On the other hand, since filter body 1 in this embodiment has a sheet piece 11 one and a half times as large as that of the conventional filter body 9, the filter body 1 in this embodiment has a deodorizing ability 50% greater than the conventional filter body 9, provided that the length of each piece of sheet 11 is approximately equal.

Next, a modification of the frame 2 is explained.

Figure 5:
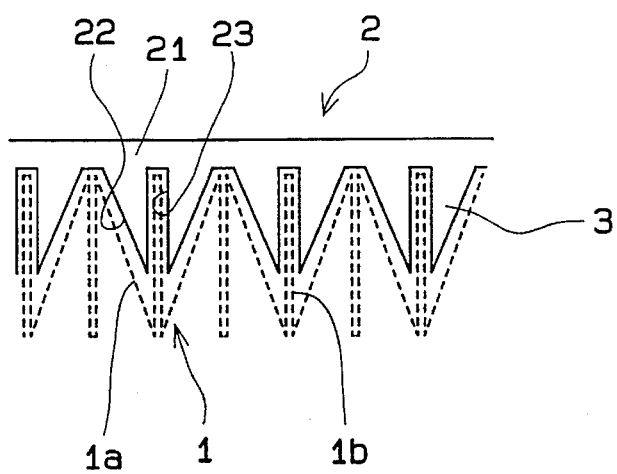
FIG. 5 is a schematic side view showing a modification of the frame holding the filter body shown in FIG. 3.

As shown in FIG. 5, the frame 2 has a pair of pieces 21 (only one of them is shown in FIG. 5) extending at a right angle to the fold L of the filter body 1, and the piece 21 has V groove portion 22 which come into contact with both faces of the pieces of adjacent pairs of filter section 1a and deep groove portion 23 which hold the deodorizing section 1b installed alternatively with V groove portion 22 in a concave shape and protruding to one side.

According to such structure of the frame 2, it is easy to hold the shape of filter body 1 without any deformation.

Figure 6:
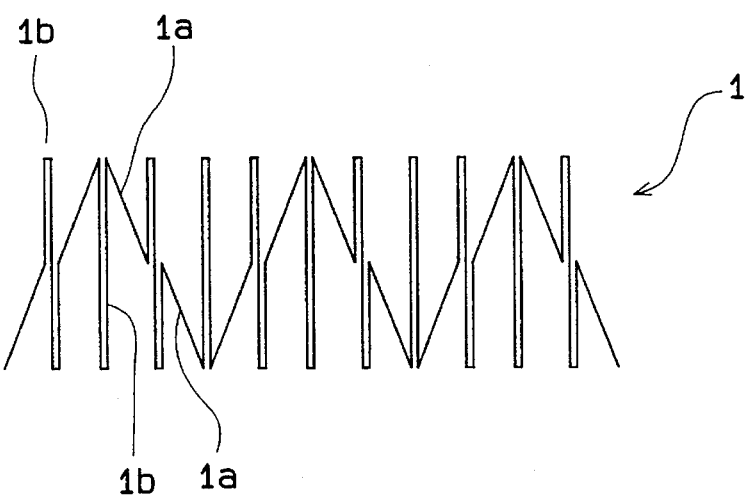
FIG. 6 is a schematic view of a filter body of a deodorizing air filter in another embodiment of the present invention.

A second embodiment of the present invention is explained below with respect to FIG. 6.

In this embodiment, a deodorizing section 1b of the filter body 1 is formed with half the pitch of the deodorizing section 1b of the filter body shown in FIG. 3. According to this embodiment, it is possible to improve the filter's deodorizing ability, the increase in ventilation resistance and pressure loss is relatively small.

For manufacturing a deodorizing air filter having a deodorizing ability which is improved to a comparatively small degree, it is possible to construct each of filter sections 1a shown in FIG. 3 as multiple pieces folded into a zigzagged shape.

It is also possible that each of the overlapping pieces of sheet 11 of the deodorizing section 1b are put together with adhesive.

A third embodiment of the present invention is described below.

Figure 7:
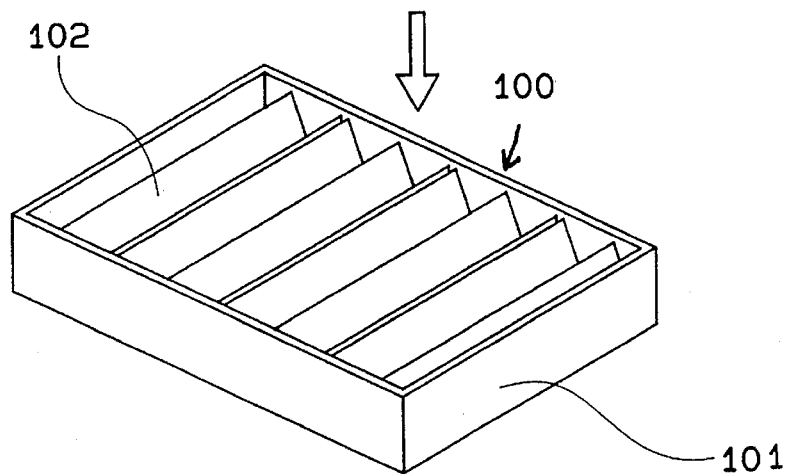
FIG. 7 is a perspective view showing a third embodiment of the present invention.
Figure 8:
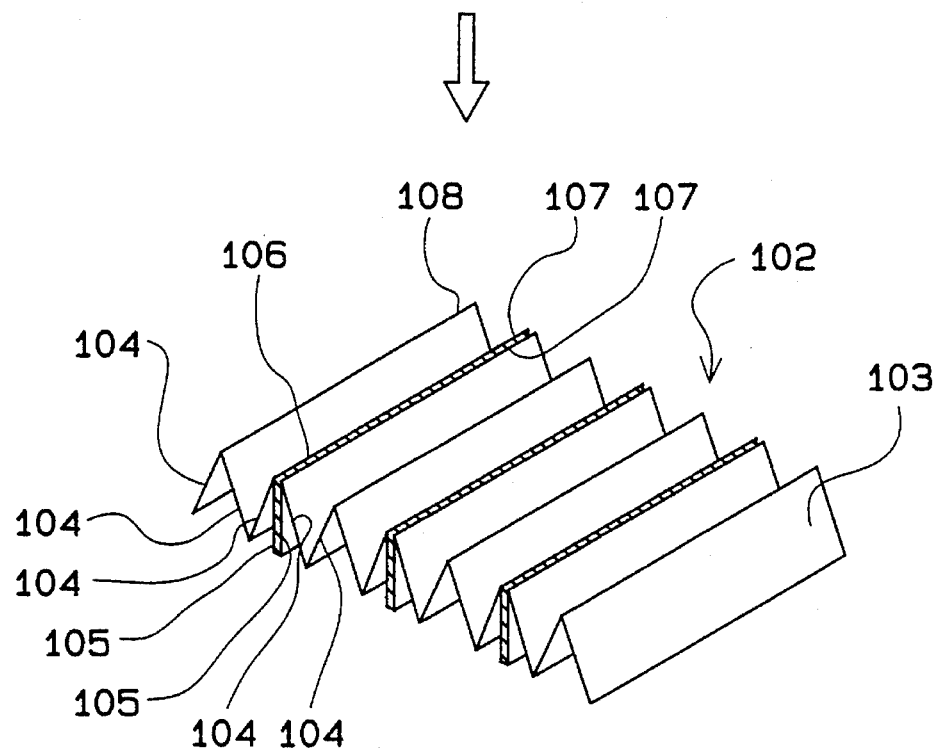
FIG. 8 is a perspective view showing a filter body in third embodiment.

FIG. 7 is a perspective view of a filter according to the third embodiment of the present invention, and FIG. 8 is a perspective view of a filter body used in the filter shown in FIG. 7. A filter 100 is installed on an air inlet port of an air conditioner for automobiles or in an air cleaner for automobiles. A direction of air flow is shown with an arrow. The filter 100 has a frame body 101 made of resin and a filter body 102. The filter body 102 is bonded to an inner side surface of the frame body 101 with hot melt type adhesive and expands in a plane direction.

As shown in FIG. 8, the filter body 102 is made up of a series of filter elements 103 such as nonwoven fabric which serve only as air filters. Each filter element 103 may be adhered with deodorant thereon to provide a deodorizing function in addition to the filtering function.

The filter element 103 is continuously formed by folding alternately with a predetermined equal pitch, and is partially formed by folding with a smaller pitch. Adjacent pieces of the filter element with the smaller pitch are parallel to the air flow, and such adjacent pieces are put together with an adhesive layer 106 made of hot melt type adhesive.

The filter element 103 is alternately provided with a filter section which has several leaning filter pieces 104 extending obliquely by alternately changing their leaning direction and a reinforced section which has tow parallel filter pieces 105 extending parallel to the air flow. The adhesive layer 106 made up of hot melt type adhesive is formed between the parallel filter pieces 105. The adhesive layer 106 improves the bending strength not only by hot melt type adhesive but also by bonding the two parallel filter pieces 105 with hot melt type adhesive, in addition to the improvement of the bending strength by only parallel filter piece 105 in the direction shown with the arrow mark in FIG. 8.

The parallel filter pieces 105 in the filter element 105 extend to droop toward the downstream of air from a top section 108 in which the filter body forming a zigzagged shape protrudes toward the upstream direction of airflow.

The filter in this embodiment is manufactured as below. A series of belt-like filter elements 103 is folded alternately with a predetermined equal pitch, the small-pitched sections are formed in several locations of the filter element 103, two adjacent pieces in the small pitched sections are formed into parallel filter pieces 105, and the adjacent parallel filter pieces are bonded. Finally, the filter body 102 is bonded to the frame body 101.

According to the third embodiment as described above, by applying the present invention to a filter element which has only a filtering function, it is possible to impose the bending strength of the filter body itself, without any complicated and high-cost structure in which a special reinforcement extends in the air flow passage.

In addition, by providing the deodorizing function on the filter element, it is possible to enlarge the surface area on the filter element having the deodorizing function, and an increase in the ventilation resistance is also prevented.

A fourth embodiment of the present invention is explained below with respect to FIG. 9.

Figure 9:
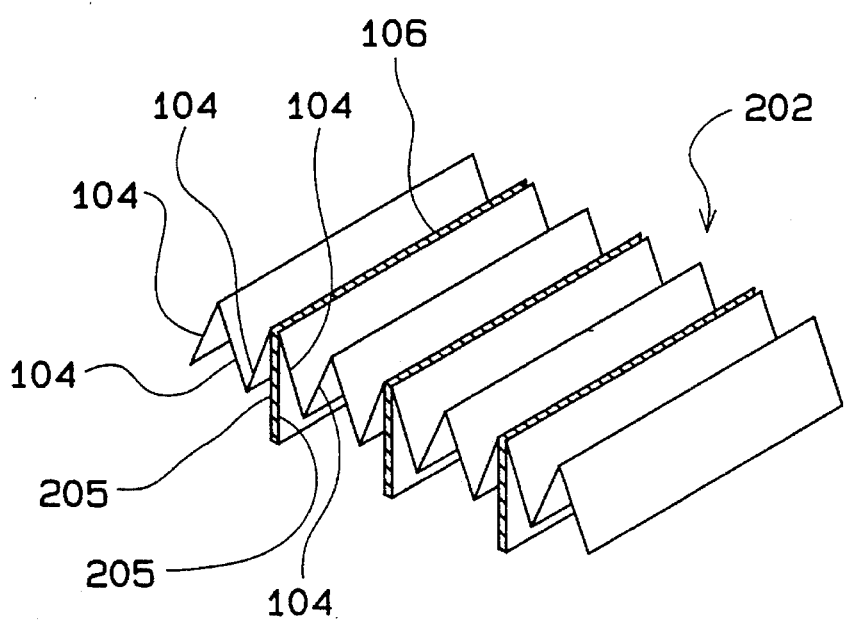
FIG. 9 is a perspective view showing a fourth embodiment of the present invention.

FIG. 9 is a perspective view of a filter body 202 in the fourth embodiment of the present invention. The same portions shown in FIG. 8 are provided with the same reference numbers and the different points therebetween are explained below.

In this embodiment, the bending strength is further improved by making parallel filter pieces 205 longer than leaning filter pieces 104. Moreover, in this embodiment, by providing the deodorizing function ont he filter element, it is possible to enlarge the surface area of the filter element having the deodorizing function.

In the third and fourth embodiments as described above, though a hot melt type adhesive has been applied to the entire surface between the two adjacent parallel filter pieces 105, it may be also applied only to partial surfaces thereof. For instance, it may be applied between top portions 107, which is a tangent line with parallel filter pieces 105 and leaning filter pieces 104. Furthermore, although the adhesive which has a high rigidity in a cured condition such as hot melt type adhesive is preferable, various kinds of adhesives can be applied. In addition, the bending strength is improved even without adhesive.

As a further improvement, the bending strength may be improved by continuously forming two or more parallel filter pieces 105 and bonding them together.

Moreover, although it is preferable to form a filter body by folding a series of belt-like filter elements, it is also possible that a plurality of filter sections are formed by folding a plurality of plate-like filter elements, each of the filter sections is connected by bonding the filter pieces to each other at end portions thereof, and such connected filter pieces may be used for the parallel filter pieces in the above-mentioned embodiment.

Furthermore, the parallel pieces of filter materials may be formed to extend from the bottom toward the upstream, in addition to drooping from the top toward the downstream. According to such configuration that the parallel filter pieces extend from the tope toward the downstream or from the bottom toward the upstream, it is possible to improve the bending strength of the filter body while suppressing an increase in its thickness by effectively using the triangular space between leaning filter pieces.

What is claimed is:

1. A folded filter element for filtering fluid formed from a single filtering sheet into a wave shape by folding with an equal pitch so that a plurality of equal pitch portions having a same width are formed in a longitudinal direction, said folded filter element being disposed in a direction diagonal to a fluid flow which is led thereinto, wherein said folded filter element is provided with small pitch portions between said equal pitch portions, said small pitch portions being formed by folding with a small pitch which is smaller than said equal pitch in width, and an entire surface of said small pitch portion at one side being in contact with the next pitch portion.

2. A folded filter element according to claim 1, wherein a pair of adjacent small pitch portions are provided between said equal pitch portions, and said pair of adjacent small pitch portions are in contact each other.

3. A folded filter element according to claim 2, wherein said pair of adjacent small pitch portions are disposed in parallel with a direction of said fluid flow.

4. A folded filter element according to claim 3, wherein said filter is disposed in a frame body installed in a fluid flow passage.

5. A folded filter element according to claim 4, wherein said frame body is installed in an air inlet of an air conditioner.

6. A folded filter element according to claim 5, wherein said filtering sheet is an air filtering sheet on which deodorant is adhered.

7. A folded filter element according to claim 2, wherein said pair of adjacent small pitch portions are bonded by an adhesive layer.

8. A folded filter element according to claim 7, wherein said pair of adjacent small pitch portions are disposed in parallel with a direction of said fluid flow.

9. A folded filter element according to claim 8, wherein said filter is disposed in a frame body installed in a fluid flow passage.

10. A folded filter element according to claim 9, wherein a plurality of said smaller pitch portions are formed in said filter element every selected length.

11. A folded filter element according to claim 9, wherein said frame body is installed in an air inlet of an air conditioner.

12. A folded filter element according to claim 11, wherein said filtering sheet element is an air filtering sheet on which deodorant is adhered.

13. A folded filter element according to claim 3, wherein said equal pitch portions formed on both sides of said small pitch portion forms a V-shape, and said pair of adjacent small pitch portions extend from a top to an opening end of said V-shape.

14. A folded filter element according to claim 13, wherein each height of said small pitch portions and each height of said equal pitch portions in said fluid flow direction are equal.

15. A folded filter element according to claim 13, wherein each height of said small pitch portions is smaller than that of said equal pitch.

* * * * *